United States Patent Office 3,403,155
Patented Sept. 24, 1968

3,403,155
BENZO[6,7]CYCLOHEPTA[1,2,3-d,e]ISOQUINOLINE CARBONITRILES
Leslie G. Humber, Dollard des Ormeaux, Quebec, and Martin A. Davis, Montreal, Quebec, Canada, assignors to American Home Products Corporation, New York, N.Y., a corporation of Delaware
No Drawing. Filed June 7, 1966, Ser. No. 555,674
3 Claims. (Cl. 260—283)

ABSTRACT OF THE DISCLOSURE

There are disclosed herein 3-cyano-7,8-dihydrobenzo[6,7]cyclohepta[1,2,3-d,e]isoquinoline and the intermediates 7,8-dihydrobenzo[6,7]cyclohepta[1,2,3-d,e]isoquinoline, and 2-(p-toluenesulfonyl)-3-cyano-2,3,7,8-tetrahydrobenzo[6,7]cyclohepta[1,2,3-d,e]isoquinoline used in its preparation. The compounds have anti-bacterial properties and methods for their preparation and use are also given.

---

This invention relates to certain novel polynuclear isoquinoline derivatives containing carbonitrile substituents, and to processes for preparing same. The compounds of this invention may be represented generically by Formula I

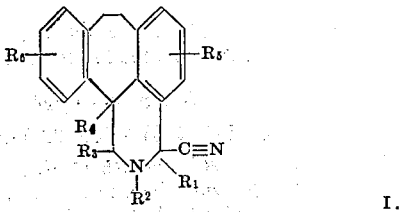

in which $R_1$, $R_2$, $R_3$ and $R_4$ may represent hydrogen, or $R_1$ and $R_2$ together, and $R_3$ and $R_4$ together, may represent a valency bond; and $R_5$ and $R_6$ may represent one or more substituents on an aromatic ring, such substituents including lower alkyl, halogen, hydroxyl, lower alkoxy, alkylthio and trihalomethyl groups.

This invention also relates to processes for the preparation of the pharmacologically active compounds described herein, and to intermediates used in their preparation. These processes are illustrated schematically below and are described further in the examples.

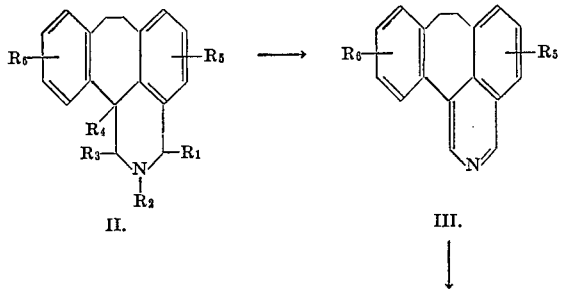

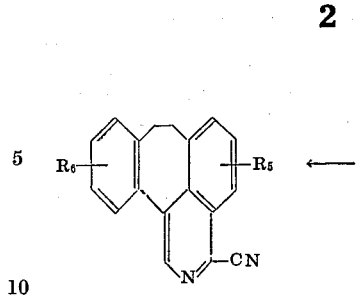

The starting materials of Formula II may be prepared by reacting 2-oxo-1,6,7,11b-tetrahydro-2H-dibenz[cd,h]azulene described by C. Van der Stelt, et al. in Receuil des Travaux de Chimie de Pays-Bas, vol. 84, page 1466 (1965) with sodium azide in trichloroacetic acid to obtain the intermediate lactam, 3-oxo-1,2,3,7,8,12b-hexahydrobenzo[6,7]cyclohept[1,2,3-d,e]isoquinoline. The latter compound is reduced with a metal hydride to yield the desired starting material of Formula II in which $R_5$ and $R_6$ represent hydrogen, 1,2,3,7,8,12b-hexahydrobenzo[6,7]cyclohepta[1,2,3-d,e] isoquinoline. The same procedure may also be carried out with azulene derivatives substituted in the aromatic rings, to yield the desired starting materials of Formula II in which $R_5$ and $R_6$ represent substituents as defined above. The above process is also described in our co-pending U.S. patent application, S.N. 484,440, filed, Sept. 1, 1965, issuing as a patent simultaneously herewith.

The compounds of Formula II obtained above, in which $R_5$ and $R_6$ are as defined above, $R_1$ and $R_2$ jointly represent a valency bond, and $R_3$ and $R_4$ are hydrogen, are reacted with a suitable dehydrogenating agent, such as, palladium or selenium, at a temperature between 60° and 200°, either in the absence of a solvent, or, a suitably inert solvent may be used, such solvents, including, for example, aromatic hydrocarbon solvents such as, toluene or xylene. The resulting aromatic isoquinoline derivatives III, in which $R_5$ and $R_6$ are as defined above, is treated with an aqueous solution of an alkali metal cyanide and with a suitable aromatic sulphonic acid halide such as, for example para-toluenesulphonyl chloride, in an inert organic solvent, such as, dichloromethane, at a temperature between 0° and 100°, to yield the compounds of Formula IV, in which $R_5$ and $R_6$ are as defined above and $R_1$ represents a hydrogen atom. Said compounds of Formula IV are subsequently treated with an alkaline agent, such as, for example, an alkali metal hydride, in a suitable inert solvent, for example, toluene, at a temperature between 50° and 150°, to yield the compounds of Formula V, in which $R_5$ and $R_6$ are as defined above. Treatment of the compounds of Formula V with a suitable reducing agent results in the introduction of two, or, of four hydrogen atoms to yield the compounds of Formula I, in which $R_1$, $R_2$, $R_3$, $R_4$, $R_5$, and $R_6$ are as defined above. Suitable reducing agents include hydrogen in the presence of a noble metal catalyst. The latter compounds of Formula I may be reacted with pharmacologically acceptable acids to form their corresponding acid addition salts.

The compounds of this invention of Formula I possess useful pharmacological properties, both in the form of their free bases, or as acid addition salts with pharmaceutically acceptable acids, as antibacterial agents, being active against *Staphylococcus pyogenes* (both penicillin sensitive and penicillin resistant strains) *Sarcina lutea*, *Streptococcus faecalis*, *Escherichia coli*, *Aerobacter aerogenes*, *Salmonella pullorum*, *Pseudomonas aeruginosa*, *Proteus mirabilis*, and *Proteus vulgaris*.

As antibacterial agents for topical use, the compounds of Formula I may be formulated as solutions, creams, or lotions with pharmacologically acceptable vehicles containing from 0.1 to 1.0 percent of the active ingredient. Such formulations may be applied topically to the site of infection as required.

The following examples serve to illustrate the invention.

EXAMPLE 1

7,8-dihydrobenzo[6,7]cyclohepeta[1,2,3-d,e]isoquinoline 1,7,8,12b - tetrahydrobenzo[6,7]cyclohepta[1,2,3, - d,e]isoquinoline (60 gm.) and 10% palladium on charcoal (10 gm.) are heated together at 215–225° C. for 1 hour. The mixture is cooled and benzene is added. Filtration through Celite removes the catalyst and the filtrate is fractionally distilled to yield the title compound as an oil, B.P. 150–158° C. (0.2–0.1 mm.). Analysis confirms the empirical formula $C_{17}H_{13}N$.

The hydrochloride salt is prepared with ethereal hydrogen chloride and has M.P. 215° C. Analysis confirms the empirical formula $C_{17}H_{14}ClN$.

EXAMPLE 2

2-(p-toluenesulphonyl)-3-cyano-2,3,7,8-tetrahydrobenzo-[6,7]cyclohepta[1,2,3-d,e]isoquinoline To a well stirred mixture of potassium cyanide (970 mg.) in water (5.0 ml.) and 7,8-dihydrobenzo[6,7]cyclohepta[1,2,3-d,e]isoquinoline (1.16 gm.) in dichloromethane (5.0 ml.), is added dropwise, p-toluenesulphonyl chloride (1.9 gm.) in dichloromethane (5.0 ml.). The mixture is stirred at room temperature overnight, the organic phase is separated, and washed successively with water, 10% aqueous hydrochloric acid 5% aqueous sodium hydroxide and saturated aqeuous sodium chloride. Evaporation of the solvent leaves a brown oil which is washed with ether and then crystallized twice from a benzene-hexane mixture to yield the title compound with M.P. 159–161° C.;

$\nu_{max.}^{CHCl_3}$ 1370 and 1170 cm.$^{-1}$; $\lambda_{max.}^{EtOH}$ 295 m$\mu$ ($\epsilon$=8780) 235 m$\mu$ ($\epsilon$=24,600)

Analysis confirms the empirical formula $C_{25}H_{20}N_2O_2S$.

EXAMPLE 3

3-cyano-7,8-dihydrobenzo[6,7]cyclohepta[1,2,3-d,e]isoquinoline

2 - (p - toluenesulphonyl) - 3 - cyano - 2,3,7,8 - tetrahydrobenzo[6,7]cyclohepta[1,2,3 - d,e]isoquinoline (1.1 gm.) is dissolved in toluene (10 ml.) containting 50% sodium hydride in mineral oil (140 mg.) and the mixture is refluxed for 3 hours and filtered while still warm. The filtrate is evaporated and the residue is crystallized from isopropanol to yield the title compound, M.P. 131–132° C. Analysis confirms the empirical formula $C_{18}H_{12}N_2$.

We claim:

1. A compound selected from the group which consists of compounds of the formula

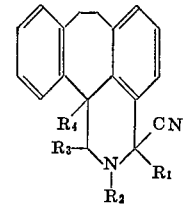

wherein $R_1$, $R_2$, $R_3$ and $R_4$ are selected from the group consisting of: $R_1$, $R_2$, $R_3$ and $R_4$ represent hydrogen; and $R_1$ and $R_2$ together, and $R_3$ and $R_4$ together, represent a valency bond; and acid addition salts thereof with pharmacologically acceptable acids.

2. 7,8 - dihydrobenzo[6,7]cyclohepta[1,2,3 - d,e]isoquinoline.

3. 3 - cyano - 7,8 - dihydrobenzo[6,7]cyclohepta[1,2,3-d,e]isoquinoline, as claimed in claim 1.

References Cited

UNITED STATES PATENTS

| 3,184,464 | 5/1965 | Hoack et al. | 260—287 |
| 3,249,614 | 5/1966 | Young | 260—283 |
| 3,258,488 | 6/1966 | Judd et al. | 260—283 X |
| 3,291,801 | 12/1966 | Montgomery | 260—289 |
| 3,310,565 | 3/1967 | Galantay | 260—288 |
| 3,311,633 | 3/1967 | Brossi | 260—288 |

NICHOLAS S. RIZZO, *Primary Examiner.*

DONALD G. DAUS, *Assistant Examiner.*